United States Patent
Boveington et al.

(10) Patent No.: US 11,097,485 B2
(45) Date of Patent: Aug. 24, 2021

(54) SYSTEM AND METHOD FOR RESOURCE ESTIMATION OF ADDITIVE MANUFACTURING

(71) Applicant: Solar Turbines Incorporated, San Diego, CA (US)

(72) Inventors: Tyler Boveington, San Diego, CA (US); Branden Elam, Oroville, CA (US); Timothy Evans, San Diego, CA (US); Greg Balow, San Diego, CA (US); Drew Dominique, Lakeside, CA (US)

(73) Assignee: Solar Turbines Incorporated, San Diego, CA (US)

( * ) Notice: Subject to any disclaimer, the term of this patent is extended or adjusted under 35 U.S.C. 154(b) by 233 days.

(21) Appl. No.: 16/405,750

(22) Filed: May 7, 2019

(65) Prior Publication Data
US 2020/0353688 A1    Nov. 12, 2020

(51) Int. Cl.
*B29C 64/386* (2017.01)
*G06F 30/00* (2020.01)
*B33Y 50/00* (2015.01)
*G06F 119/18* (2020.01)

(52) U.S. Cl.
CPC .......... *B29C 64/386* (2017.08); *G06F 30/00* (2020.01); *B33Y 50/00* (2014.12); *G05B 2219/45031* (2013.01); *G06F 2119/18* (2020.01)

(58) Field of Classification Search
CPC ... B29C 64/386; G06F 30/00; G06F 2119/18; B33Y 50/00; G06B 2219/45031
USPC .............. 702/1; 705/7.23, 7.35; 700/97, 99
See application file for complete search history.

(56) References Cited

U.S. PATENT DOCUMENTS

| | | | |
|---|---|---|---|
| 5,539,652 A * | 7/1996 | Tegethoff | G06F 30/20 703/14 |
| 6,076,080 A * | 6/2000 | Morscheck | G06Q 10/087 705/400 |
| 2002/0087440 A1* | 7/2002 | Blair | G06Q 30/06 705/29 |
| 2003/0004768 A1* | 1/2003 | Bury | G06Q 10/06 705/37 |

(Continued)

OTHER PUBLICATIONS

Schroder, Malte, et al., Evaluation of Cost Structures of Additive Manufacturing Processes Using a New Business Model, ScienceDirect, 7th Industrial Product-Service Systems Conference, Procedia CIRP 30 (2015) 311-316.

(Continued)

*Primary Examiner* — Ly D Pham
(74) *Attorney, Agent, or Firm* — Procopio, Cory, Hargreaves & Savitch LLP

(57) ABSTRACT

A system and method for resource estimation of an additive manufacturing device is disclosed herein. The system includes at least one processor and one or more software modules. The processor executes the one or more software modules to determine a number of parts that can be manufactured per manufacturing run, estimate manufacturing time to manufacture a specified number of parts, and determine a total cost to manufacture the number of parts with the additive manufacturing device. The one or more software modules can compare the total cost to the cost of a current manufacturing method.

18 Claims, 4 Drawing Sheets

(56) References Cited

U.S. PATENT DOCUMENTS

| | | | | |
|---|---|---|---|---|
| 2003/0187808 A1* | 10/2003 | Alfred | ............. | G06Q 30/06 |
| | | | | 705/400 |
| 2009/0199734 A1* | 8/2009 | Vered | ............. | G06Q 10/06 |
| | | | | 101/483 |
| 2011/0213715 A1* | 9/2011 | George | ............. | G06Q 10/067 |
| | | | | 705/301 |
| 2015/0127480 A1* | 5/2015 | Herrman | ............. | G06Q 30/0283 |
| | | | | 705/26.4 |
| 2015/0254693 A1* | 9/2015 | Kozhukhin | ............. | G06F 30/20 |
| | | | | 705/7.35 |
| 2016/0129636 A1 | 5/2016 | Cudak et al. | | |
| 2020/0006100 A1* | 1/2020 | Clark | ............. | H01L 22/20 |

OTHER PUBLICATIONS

Mahadik, Aditya, et al., Implementation of Additive Manufacturing Cost Estimation Tool (AMCET) Using Break-down Approach; ScienceDirect, 28th International Conference on Flexible Automation and Intelligent Manufacturing, Procedia Manufacturing 17 (2018) 70-77.

Charalambis, Alessandro, et al., Cost Estimation of a Specifically Designed Direct Light Processing (DLP) Additive Manufacturing Machine for Precision Printing, Conference Paper, Oct. 2017, https://www.researchgate.net/publication/320333520.

Busachi, Alessandro, et al., A System Approach for Modelling Additive Manufacturing in Defence Acquisition Programs, 11th CIRP Conference on Intelligent Computation in Manufacturing Engineering, Procedia CIRP 67 (2018) 209-214.

* cited by examiner

SYSTEM AND METHOD FOR RESOURCE ESTIMATION OF ADDITIVE MANUFACTURING

TECHNICAL FIELD

The present disclosure generally pertains to additive manufacturing. More particularly this application is directed towards a system and method for resource estimation of additive manufacturing.

BACKGROUND

Additive manufacturing, often referred to as three-dimensional (3D) printing, is a process of making a three-dimensional object from a digital model using an additive process, where successive layers of material are laid down over previous layers. 3D printing is becoming a big industry with a growing number of printer manufacturers and web sites that provide construction plans in the form of a data file for downloading to a computer. Unfortunately, 3D printing is much more complex than 2D printing and requires much more time to produce an object. Objects that are printed at a fine level of detail, made of costly materials, or are large can require substantial resources. Ideally, a part is not chosen to be 3D printed if the required resources are more than the required resources of a part made with other manufacturing techniques.

U.S. patent application Ser. No. 14/537,935 to Cudak, et al. describes a method that includes identifying a data file including parameters for causing a three-dimensional printer to print a three-dimensional model of an object, identifying a total time or total cost threshold for printing the three-dimensional model of the object on the three-dimensional printer, obtaining a unit time or unit cost for one or more resources required for printing, modifying one or more of the parameters of the data file so that the three-dimensional model of the object can be printed without exceeding the time or cost threshold, and causing the three-dimensional printer to print the three-dimensional model of the object using the modified parameters.

The present disclosure is directed toward overcoming one or more of the problems discovered by the inventors or that is known in the art.

SUMMARY

A resource estimation system for additive manufacturing is disclosed herein. A resource estimation system for an additive manufacturing device. The system comprises at least one processor and a memory storing software that can be executed by the at least one processor. The memory storing software executed by the at least one processor receives part information including a part width, a part depth, a build plate area of the additive manufacturing device, a number of parts to be manufactured, a type of build material, a part volume, a shape complexity value, and a current cost.

The memory storing software executed by the at least one processor references a portion of the part information and determines a number of parts to be manufactured per manufacturing run based on the part width, the part depth, and the build plate area of the additive manufacturing device.

The memory storing software executed by the at least one processor references a portion of the part information and determines a number of manufacturing runs based on the number of parts to be manufactured and the number of parts that can be manufactured per manufacturing run.

The memory storing software executed by the at least one processor references a portion of the part information and estimates manufacturing time by referencing the part volume, referencing the build material, referencing a database including manufacturing speed information with regards to the type of build material, referencing the number of parts that to be manufactured.

The memory storing software executed by the at least one processor references a portion of the part information and determines a material cost based on the type of build material, the part volume, and the number of parts that can be manufactured per manufacturing run.

The memory storing software executed by the at least one processor references a portion of the part information and determines a utility cost based on the estimated manufacturing time and utilities to be used for manufacturing the part.

The memory storing software executed by the at least one processor determines a capital cost that is proportionate to the cost of the additive manufacturing device based on the estimated manufacturing time and an operational lifetime of the additive manufacturing device.

The memory storing software executed by the at least one processor determines an operation labor cost based on a setup time, a teardown time, and a labor rate.

The memory storing software executed by the at least one processor references a portion of the part information and determines a post processing cost based on the number of parts to be manufactured, the type of build material, and the shape complexity value.

The memory storing software executed by the at least one processor determines a total cost per manufacturing run based on the material cost, utility cost, capital cost, operation labor cost, and post processing cost.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
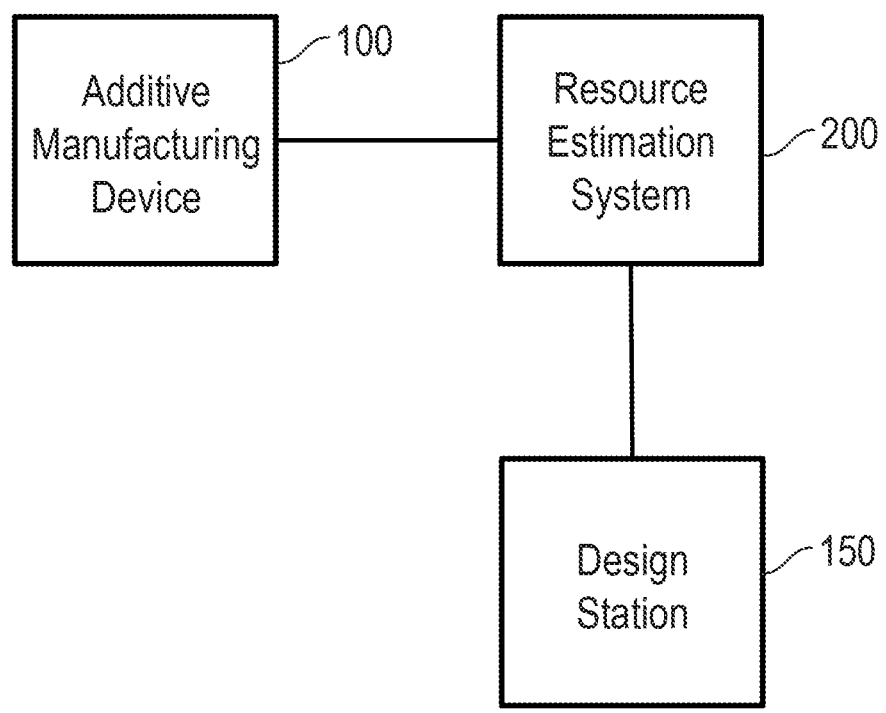
FIG. 1 is a functional block diagram of an exemplary system including an additive manufacturing device, a resource estimation system, and a design station.

FIG. 1 is a functional block diagram of an exemplary system including an additive manufacturing device 100, a resource estimation system 200, and a design station 150. A resource estimation system 200 can communicate with an additive manufacturing device 100 and a design station 150.

The additive manufacturing device 100 can comprise a three dimensional (3D) printer that can manufacture/print 3D objects in various materials including metals such as nickel alloys and stainless steels as well as plastics. The additive manufacturing device 100 can include a build plate area and a build plate volume and can communicate its dimensional details to the resource estimation system 200. The additive manufacturing device 100 can be configured to place layers of material at predetermined layer heights and layer height information may be communicated to the resource estimation system 200. The additive manufacturing device 100 can include consumables such as one or more filters and/or a recoater blade. The one or more filters can last for generally one year. Alternatively the filters may remain operational for less than a year or more than a year.

The design station 150 can be operable to design a three dimensional part such as with computer aided design (CAD) software. The dimensional information of the three dimensional part can be communicated with the resource estimation system 200.

The resource estimation system 200 can receive part information, such as dimensional information, part material information, and part quantity information, and use the part information to determine information relating to resource use of the additive manufacturing device 100. The resource estimation system 200 can also receive other information, such as information relating to the additive manufacturing machine 100 or costs such as labor rates.

Figure 2:
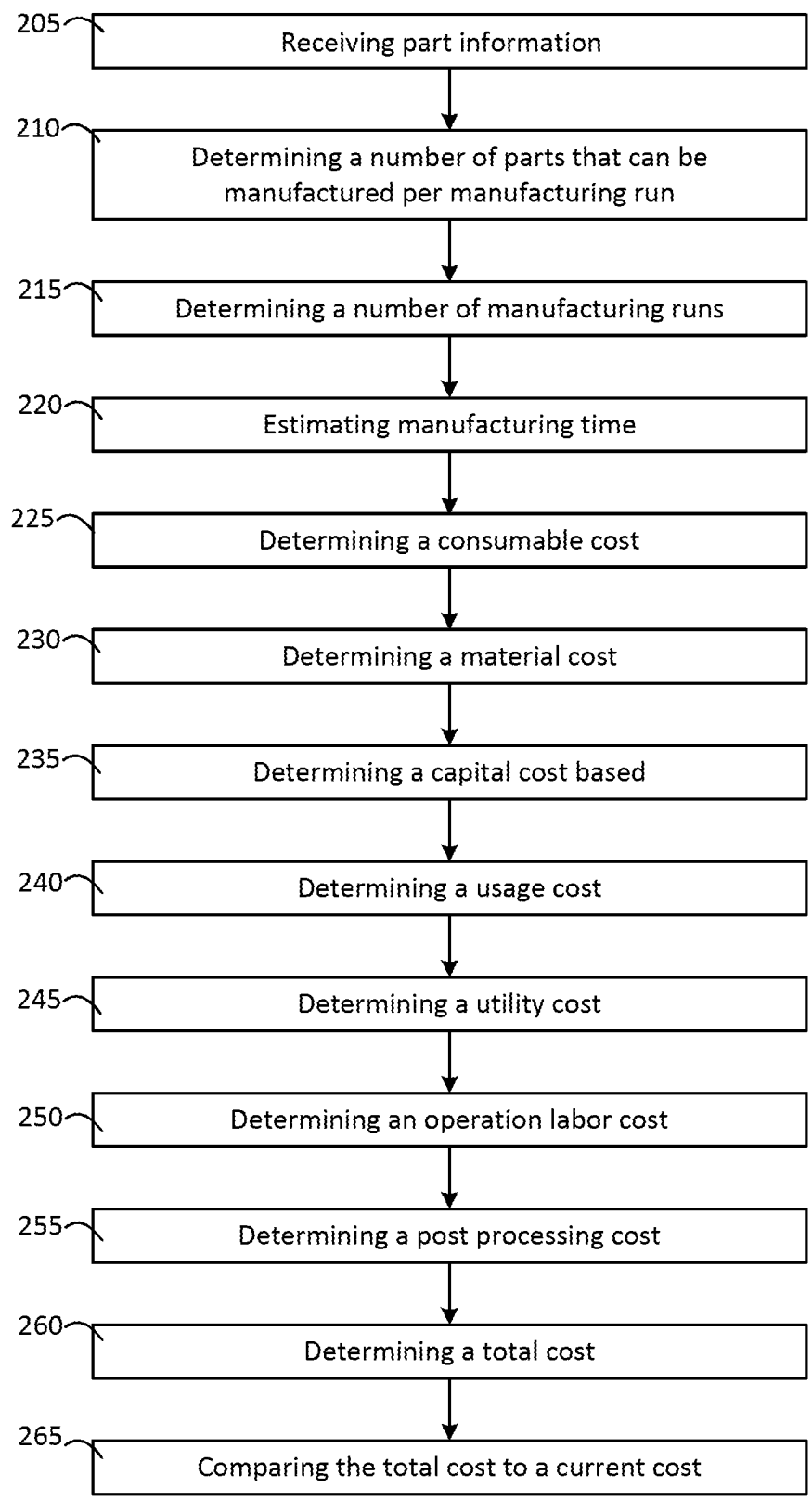
FIG. 2 is a flowchart of a method for resource estimation.

FIG. 2 is a flowchart of a method for resource estimation. The flow chart depicts a process, or in other words a method, which can be implemented by the resource estimation system 200 for at least one part to be manufactured, for example, by the additive manufacturing device 100. Unless indicated otherwise, the method continues from block to block in the direction of the arrows. However, not all steps are directly dependent on the previous step. In other examples, the order of the steps can be varied, rearranged, and may include additional steps and remove steps. In an embodiment the method begins at block 205, when the resource estimation system 200 receives part information. The part information can include a part width, a part height, a part depth, and a part volume. The part information can be communicated from another device, such as the design station 150, to the resource estimation system 200. The part information can be automatically communicated to the resource estimation system 200 or can be executed and selected by a user. Alternatively, a user can manually input the part information into designated fields within a graphical user interface shown on the resource estimation system 200. The part information can include a build material, if the part is for development or production, and project relevant information. The project relevant information, for example, can include fields for a product group, a current process, a replacement type, and a submitting engineer's name.

The part information can include expected post processing needed for each part manufactured by the additive manufacturing device 100. The part information can include volume removal methods such as a volume to be removed from the part by milling, a volume to be removed from the part by turning, and a volume to be removed from the part by electric discharge machining (EDM). Each of these volume values can be accompanied by a shape complexity field that indicates how complex the geometry of the part is. For example, the shape complexity field can be selected as easy, normal, hard, or not required. Milling, turning, and EDM can have different material removal rates for different materials which can be included in the part information. The volume removal methods can have different setup time, time between parts, and non-engagement factors, depending on the shape complexity selected. The non-engagement factor can be a value related to the amount of time material is not being removed from a part during machining.

The post processing fields can further include additional processing methods. For example, the fields can include part information including the indicated use of abrasive flow machining, thermal deburring machining, and additional post processing. The information may be selected by a user within the graphical user interface or can be included as information provided from a separate device. If abrasive flow machining, thermal deburring machining, and additional post processing are selected, additional tooling may be needed.

The part information can include a part number, a total number of parts, for example, a total number of parts to be manufactured on an annual basis, current cost of the part using a method alternative to additive manufacturing, and the current scrap rate of the current part manufacturing or part acquisition method. The total number of parts to be manufactured can be on an annual basis or other fixed amount. The current cost can be the cost to manufacture the part currently or the cost to acquire the part currently, such as purchasing the part from a third party.

The part information can include information related to the additive manufacturing device 100 such as a build plate area, number of filters used, cost of the filters, the lifetime of each filter, number of recoater blades, cost of a recoater blade, the lifetime of each recoater blade, cost of the additive manufacturing device 100, lifetime of the additive manufacturing device, cost of an additive manufacturing device warranty, life of the additive manufacturing device warranty.

The part information can include additional information such as multiple labor rates such as a first labor rate, a labor second labor rate, and so on. The part information can include multiple build materials costs such as a cost for a first build material, a material cost for a second build material, and so on. The part information can include a labor time associated with steam cleaning parts, a labor time associated with stress relieving parts, a labor time associated with wire EDM of parts, a labor time associated with tumble deburring of parts, a labor time associated with plate surfacing of the additive manufacturing device 100, a labor time associated with setting up the additive manufacturing device 100, a labor time associated with a tearing down the additive manufacturing device, a cost associated with hot isostatic pressure treating the parts on a per cubic foot basis, a cost to x-ray per part, a labor time associated with destructive testing to analyze material quality (also known as a MET analysis), a cost rate associated with argon use, and a cost rate associated with electricity use, By utilizing different portions of the part information provided, the resource estimation system 200 can determine several values.

At block 210, the resource estimation system 200 can reference a portion of the part information and determine a number of parts to be manufactured per manufacturing run based on the part width, the part depth, and the build plate area of the additive manufacturing device 100. The part width and part depth can be used to determine a rectangular footprint area to build the part. The footprint area can be considered to be non-rectangular and use a shape factor less than one to reduce the footprint area based on the actual part shape. For example for shapes with a footprint that is shaped similar to a circle, a triangle, or other non-rectangular shapes. For parts with a rectangular shaped foot print area, the shape factor could be 1 and the foot print area can remain the same. The build plate area can be set based on the maximum usable area of the additive manufacturing device 100. The build plate area can generally change with the use of a variety of different additive manufacturing devices 100. In an example, the number of parts to be manufactured per manufacturing run can be the value of the build plate area divided by the product of the part's footprint area and the part's shape factor. This value can be rounded down to determine the number of whole parts.

At block 215, the resource estimation system 200 can reference a portion of the part information and determine a number of manufacturing runs needed based on a number of parts to be manufactured and the number of parts that can be manufactured per manufacturing run. The number of manufacturing runs can be the rounded up value of the number of parts to be manufactured divided by the number of parts that can be manufactured per manufacturing run.

At block 220, the resource estimating system 200 can reference a portion of the part information and estimate a manufacturing time per manufacturing run based on the volume of each part to be manufactured, the number of parts to be manufactured, and information from a database that includes manufacturing speed information with respect to the type of build material being used. The manufacturing speed information can include the relationship between the part volume and the manufacturing time it took to manufacture that volume of a part with various build materials. The relationship between the part volume and the estimated manufacturing time may be developed by manufacturing a variety of sample parts with different shapes and sizes and measuring the manufacturing time. The measured manufacturing time can be plotted with respect to the part volume for each sample part and display a relationship between part volume and manufacturing time. This relationship can form a linear trend line. The volume of the part can be used with the trend line to produce an estimate manufacturing time per part. The estimated manufacturing time per part can be multiplied by the number of parts to be manufactured to determine the estimated manufacturing time. The resource estimation system 200 can estimate the manufacturing time per manufacturing run by multiplying the estimated manufacturing time per part by the number of parts that can be manufactured per manufacturing run.

To operate an additive manufacturing device 100, several consumables can be used including items such as filters and recoater blades. These consumables may need to be replaced per manufacturing run or have a limit on how long they can be used before replacing. At block 225, the resource estimating system 200 can reference a portion of part information and determining a consumable cost based on the consumables used. For example, the additive manufacturing device 100 may require two filters to operate. These filters may have an in-use lifetime of 1 year. The estimated manufacturing time or estimated manufacturing time per manufacturing run can be divided by the filter lifetime to determine the proportionate consumable cost of the filter. In another example the additive manufacturing device 100 uses a recoater blade for every manufacturing run. Therefore, the consumable cost would include the cost for a recoater blade for every manufacturing run considered in the consumable cost determination.

At block 230, the resource estimating system 200 can reference a portion of the part information and determine a material cost per based on the type of build material being used, the volume of each part, and the number of parts to be manufactured. The material used can be the part volume multiplied by the number of parts to be manufactured. Each build material can cost a different amount per a unit volume. The material cost can be the volume of the part multiplied by the number of parts to be manufactured per manufacturing run and then multiplied by the build material cost. The resource estimating system 200 can determine a material cost per manufacturing run by multiplying the volume of each part by the build material cost and multiplying the number of parts that can be manufactured per manufacturing run.

At block 235, the resource estimation system 200 can reference a portion of the part information and determine a capital cost based on the cost of the additive manufacturing device 100, the operational lifetime of the additive manufacturing device 100, and the estimated manufacturing time. The capital cost can be proportionate to the cost to procure the additive manufacturing device 100. The additive manufacturing device 100 can be considered to have a specific lifetime, for example, of 10 years. The additive manufacturing device 100 can be assumed to be in operation for a specific percentage of time. For example, the additive manufacturing device 100 is in operation for 70% of the time, which would mean the additive manufacturing device would have an operation lifetime of 7 years. The capital cost can be the proportion between the estimated manufacturing time and the operation lifetime of the additive manufacturing device 100 multiplied by the cost of the additive manufacturing device 100. The capital cost per manufacturing run can the proportion between the estimated manufacturing time per manufacturing run and the operation lifetime of the additive manufacturing device 100 multiplied by the cost of the additive manufacturing device 100.

At block 240, the resource estimation system 200 can reference a portion of the part information and determine a usage cost based on the cost of the additive manufacturing warranty, the life time of the warranty, and the estimated manufacturing time. The usage cost can be proportionate to the cost of an additive manufacturing device warranty. The additive manufacturing device warranty can have a specific warranty lifetime, for example, of 10 years. The usage cost can be the proportion between the estimated manufacturing time and the multiplication of the additive manufacturing device warranty lifetime and the cost of the additive manufacturing device warranty. The usage cost per manufacturing run can be the proportion between the estimated manufacturing time per manufacturing run and the multiplication of the additive manufacturing device warranty lifetime and the cost of the additive manufacturing device warranty.

At block 245, the resource estimation system can reference a portion of the part information and determine a utility cost based on the estimated manufacturing time and the utilities to be used. For example, some additive manufacturing devices use Argon gas and electricity. The argon gas and electricity utilities may be priced on a unit of time basis such as per hour. These utility rates multiplied by the estimated manufacturing time can produce utility cost.

At block 250, the resource estimation system 200 can reference a portion of the part information and determine an operation labor cost based on the setup time, the tear down time, a labor rate, and a number of manufacturing runs. The setup time can be the time to setup and prepare the additive manufacturing device 100 prior to each manufacturing run. The setup time may generally be a fixed time per manufacturing run that does not vary based on part dimensions. The tear down time can be the time to tear down and clean up subsequent to each manufacturing run. The tear down time may generally be a fixed time per manufacturing run that does not vary based on part dimensions. The labor rate can vary depending on who is doing the labor and be based on a per unit of time basis. For example, the labor may be done at a first labor rate, such as by an in-house employee. In another example, the labor may be done at a second labor rate such as a third party. There can be multiple labor rates that are included in the part information and each of the determined costs associate with a labor rate may reference a different or a similar labor rate to any of the other determined costs. The operation labor cost can be the sum of the setup time and tear down time, multiplied by the labor rate, and multiplied by the number of manufacturing runs.

At block 255, the resource estimation system 200 can reference a portion of the part information and determine a post processing cost based on the number of parts to be manufactured, the number of parts to be manufactured per manufacturing run, the number of manufacturing runs, the type of build material to be used, at least one material removal method, and a volume of material to be removed from the part by each material removal method, a labor rate, and a shape complexity value. In an example, no material is removed from the part, and no material removal method is needed. Material can be removed from the part during post processing through a variety of methods or a combination of methods. The methods for material removal can include milling, tuning, electric discharge machining, abrasive flow machining, thermal deburring machining, and additional post processing. The post processing cost can be based on a volume of material to be removed from each of the parts by milling, a volume of material to be removed from each of the parts by turning, and a volume of material to be removed from each of the parts by electric discharge machining.

The volume of material to be removed from each of the parts by milling can have different removal rates on a unit volume per unit time basis for different build materials. Similarly, the volume of material to be removed from each of the parts by tuning and by EDM can have different removal rates for different build materials. The methods of milling, tuning, and EDM can each have their own specific material removal rates that can vary in comparison with each other or may be considered the same.

The part can have a shape complexity value that can be associated with milling, tuning, and EDM methods. The shape complexity can be selected as easy, normal, hard, or not required. The shape complexity as set on easy can be associated with a set up time, a time between parts, and a non-engagement factor. The shape complexity as set on normal can have longer setup time, a longer time between parts, and a different non-engagement factor in comparison to the shape complexity set to easy. The shape complexity as set on hard can have longer setup time, a longer time between parts, and a different non-engagement factor in comparison to the shape complexity set to normal. In some examples the shape complexity value set on easy, normal, and hard can have similar setup time, time between parts, and non-engagement factor or a combination of varying values and values that are the same. The shape complexity can also be selected to not required and can have a setup time and a time between parts set to zero. Alternatively, other settings for shape complexity can be used. For example, a scale from one to ten can be used.

Milling, tuning, and EDM removal methods along with the shape complexity can have labor time values. These labor time values can be used with the number of parts to be manufactured and a labor rate to determine part of the post processing cost. The labor rate can vary depending on where the labor is performed. For example, the labor can be performed in house or by a third party and each may have different labor rates. In an example, the cost associated with milling, turning, and EDM methods can be equal to:

[(((Total Volume Removed*Number Of Parts To Be Manufactured)/Material Removal Rate)*Non Engagement Factor)+Setup Time*Number Of Manufacturing Runs+((Number Of Manufacturing Runs−1)*(Number Of Parts That Can Be Manufactured Per Manufacturing Run−1)+((Number Of Parts To Be Manufactured−(Number Of Manufacturing Runs−1)*(Number Of Parts Can Be Manufactured Per Manufacturing Run)−1))*Time Between Parts)]*Hourly Rate The post processing cost may include the methods for material removal such as abrasive flow machining, thermal deburring machining, and additional post processing. Abrasive flow machining, thermal deburring machining, and additional post processing can include additional tooling costs based on whether the part is for development or production. The cost associated with abrasive flow machining, thermal deburring machining, and additional post processing can be on a per part basis, a per manufacturing run basis, and a total part basis.

The post processing cost may include steam cleaning, stress relief, wire EDM, tumble deburr, plate resurfacing, hot isostatic pressing, x-raying, and MET Analysis. Steam cleaning the parts can have an associated cost based on the time to perform per manufacturing run and the labor rate. Stress relieving the parts can have an associated cost based on the time to perform per manufacture run and the labor rate. Stress relieving the parts can have an associated cost based on the time to perform per manufacture run and the labor rate. Wire EDM of the parts can have an associated cost based on the time to perform per manufacture run and the labor rate. Plate resurfacing can have an associated cost based on the time to perform per manufacture run and the labor rate. Hot isostatic pressing can have an associated cost per volume of space used per manufacture run. X-raying can have an associated cost per part x-rayed. Every manufactured part may not be required to be x-rayed. For example, 25% of the total manufactured parts per build may be x-rayed for quality control. MET Analysis of the parts can have an associated cost based on the time to perform per manufacture run and the labor rate.

At block 260, the resource estimation system 200 can determine a total cost based on the consumable cost, the material cost, the capital cost, the usage cost the utility cost, the operation labor cost, and the post processing cost.

The total cost can be the total cost for the total number of parts, total number of parts per annual demand, or for the total cost per manufacturing run. The total cost per part can be the total cost per manufacturing run divided by the number of parts that can be manufacture per manufacturing run.

The resource estimation system 200 can provide values, for example through a user graphical interface, for the number of parts to be manufacturing, the estimated manufacturing time, the consumable cost per, the build material cost, the utility cost, the capital cost, the operation labor cost, the post processing cost, and the total cost.

The resource estimation system 200 can further provide, for example through the graphical interface, values for the number of parts per manufacturing run, the estimated manufacturing time per manufacturing run, the consumable cost per manufacturing run, the build material cost per manufacturing run, the utility cost per manufacturing run, the capital cost per manufacturing run, the operation labor cost per manufacturing run, the post processing cost per manufacturing run, the total cost per manufacturing run.

The resource estimation system 200 can determine the total cost per part, the summation of the tooling costs, the number of additive manufacturing devices 100 based on the total number of parts to be manufactured on an annual basis, the total number of additive manufacturing device operator labor hours needed for the total number of parts to be manufactured on an annual basis, the total number of additive manufacturing device operators needed on an annual basis, the total number of post processing operator labor hours needed for the total number of parts to be manufactured on an annual basis, the total number of post processing operators needed on an annual basis, and the percentage savings between the part made by the additive manufacturing device 100 in comparison between the part made or acquired by an alternative manufacturing method or supplier.

At block 265, the resource estimation system 200 can reference a portion of the part information and compare the total cost to a current cost. The resource estimation system 200 can generate a cost analysis plot with build demand with, for example, parts per year on one axis and yearly cost to manufacture on another axis. The cost analysist plot can include the cost associated with additive manufacturing in comparison with an alternative manufacturing method such as traditional manufacturing.

Figure 3:
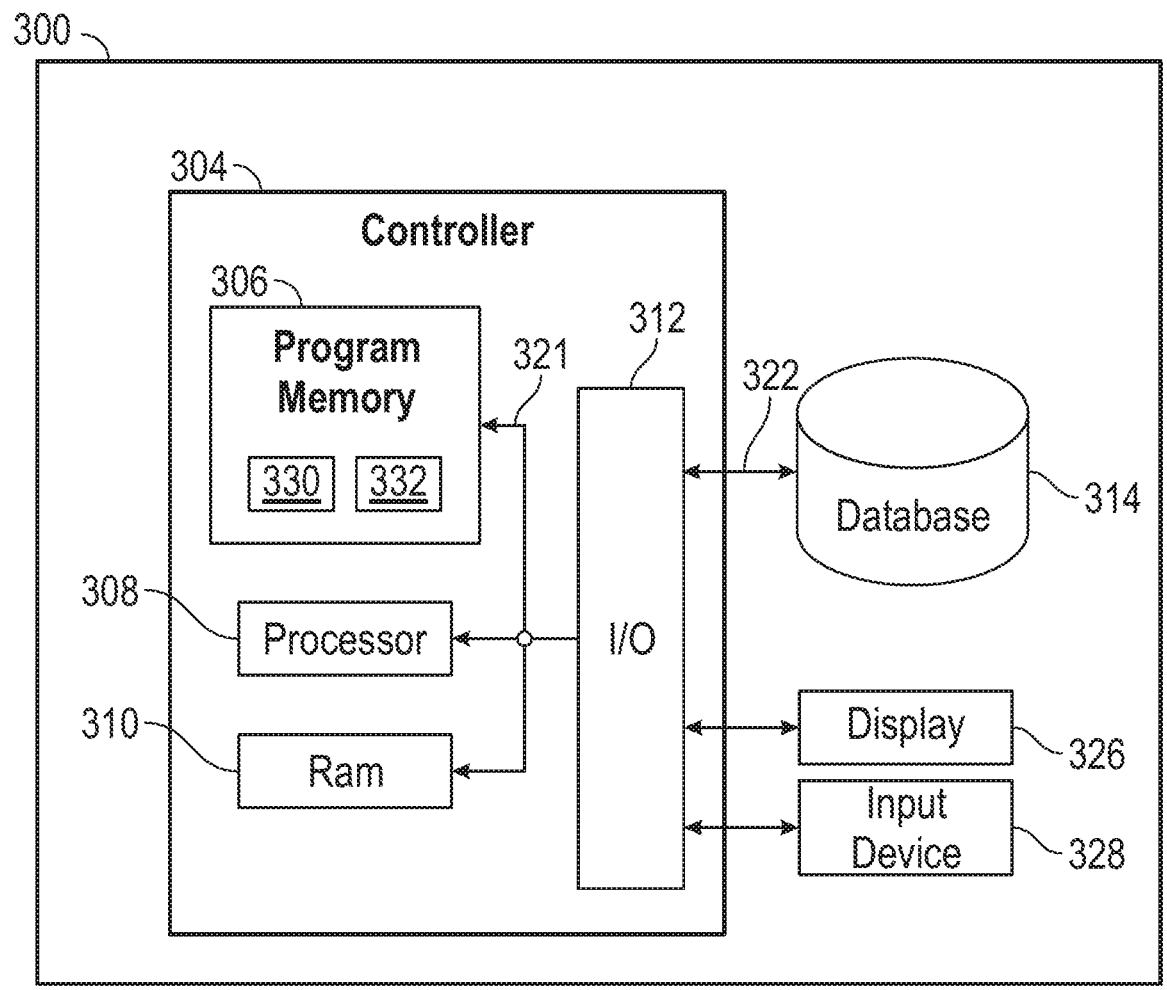
FIG. 3 is a functional block diagram of a computer system.

FIG. 3 is a functional block diagram of a computer system. In certain embodiments, the resource estimation system 200 and the design station 150 are implemented by a computer system such as computer system 300. The computer system 300 may have a controller 304 operatively connected to a database 314 via a link 322 connected to an input/output (I/O) circuit 312. It should be noted that, while not shown, additional databases 314 may be linked to the controller 304 in a known manner. Furthermore, these databases 314 may be external to the computer system 300.

The controller 304 can include a program memory 306, the processor 308 (may be called a microcontroller or a microprocessor), a random-access memory (RAM) 310, and the input/output (I/O) circuit 312, all of which are interconnected via an address/data bus 321. It should be appreciated that although only one microprocessor 308 is shown, the controller 304 may include multiple microprocessors 308. Similarly, the memory of the controller 304 may include multiple RAMs 310 and multiple program memories 306. Although the I/O circuit 312 is shown as a single block, it should be appreciated that the I/O circuit 312 may include a number of different types of I/O circuits. The RAM(s) 310 and the program memories 306 may be implemented as semiconductor memories, magnetically readable memories, nonvolatile memories, and/or optically readable memories, for example.

The program memory 306 and RAM 310 can be a non-transitory computer-readable medium having stored thereon computer-executable code (e.g., disclosed software modules or subroutines) and/or data. The program memory 306 and/or the RAM 310 may store various applications (i.e., machine readable instructions) for execution by the microprocessor 308. For example, an operating system 330 may generally control the operation of the computer system 300 and provide a computing environment to implement the processes described herein. The program memory 306 and/or the RAM 310 may also store a variety of software modules 332 for accessing specific functions of the computer system 300. The software modules 332 can be, for example, subroutines.

In addition to the controller 304, the computer system 300 may include other hardware resources. The computer system 300 may also include various types of input/output hardware such as the visual display 326 and input device(s) 328 (e.g., keypad, keyboard, mouse, etc.). In an embodiment, the display 326 can be touch-sensitive, and may cooperate with a software keyboard routine as one of the software modules 332 to accept user input. The software modules 332 may include other software modules, for example, implementing software keyboard functionality, interfacing with other hardware in the computer system 300, etc.

The display 326 can display user input fields through a graphical user interface. The input fields of the graphical user interface can accept part information and other information inputted by a user interacting with the input device 328. The graphical user interface can include fields for a user to input part information as described above.

The software modules 332 may include software modules to execute any of the operations described herein. The program memory 306 and/or the RAM 310 may further store data related to the configuration and/or operation of the computer system 300, and/or related to the operation of one or more software modules 332.

The computer system 300 may be connected to the database 314 that includes manufacturing speed in proportion to part volume and different build materials. The proportional relationship between manufacturing time and part volume and build material may be produced from recorded manufacturing/print times for different materials using different parameter sets of the additive manufacturing device 100 such as scan speed, laser power, and hatch spacing of the additive manufacturing device 100.

INDUSTRIAL APPLICABILITY

The present disclosure generally applies to the resource estimation system 200 for additive manufacturing. There are several resources and factors to consider when analyzing the use of additive manufacturing for a part. The cost to make a part using additive manufacturing can be reliant on the size and number of parts to be manufactured and the necessary resources used such as consumables, build material, additive manufacturing device 100 usage, utility usage, the amount of post processing required for the parts, and overall cost.

A user can design a three dimensional part using a design station 150. The design stations 150 can supply the user with various part information. This part information can be used with the resource estimation system 200 to estimate and determine the resources to be used to manufacture a part or multiple parts.

Figure 4:
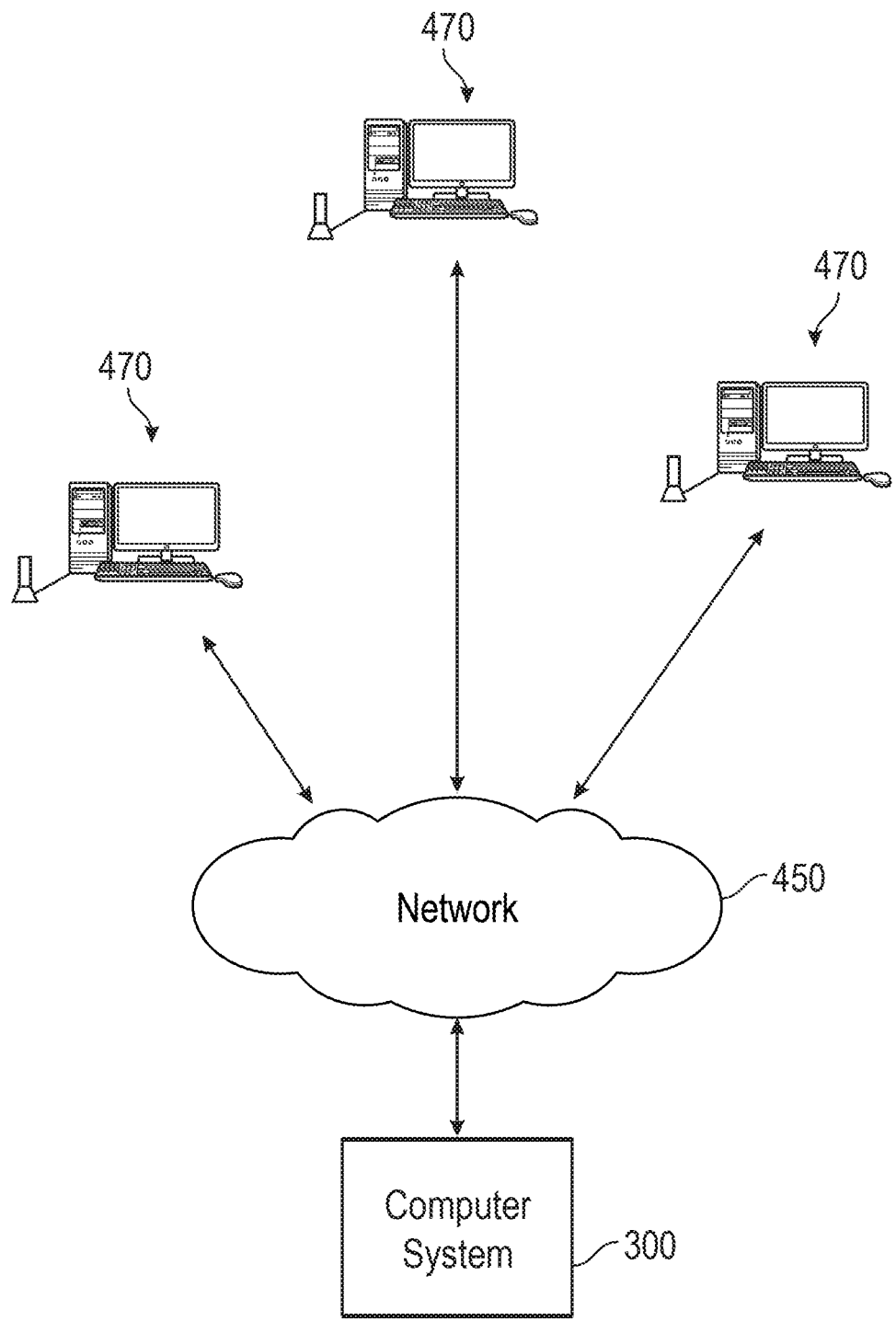
FIG. 4 is a schematic representation of a computer system in connection with a network that is connected to multiple computational devices.

FIG. 4 is a schematic representation of a system in connection with a network that is connected to multiple computers. In an embodiment, the computer system 300 can communicate with a broader network 450 through any of a number of known networking devices and techniques. For example, the computer system 300 may be connected in communicative relation with a computational device 470 such as a computer over a network 450 and share data such as the part information and determined information with these devices.

Looking in further detail to the network 450, as described previously, the computational device 470 can utilize the network 450 to receive data such as the part information and determined information from the computer system 300 (e.g., when implementing the resource estimation system 200). The network 450 can be a computer network and may be a private or public network. For example, the network 450 may comprise an intranet, local area network (LAN), wide area network (WAN), Internet, Wi-Fi, Bluetooth, or other connection between devices structured for the transmission of data. Furthermore, connections to the network 450 can be hardwired, such as through USB, Ethernet, or other connections achieved by physical tangible structure, or may be wireless, such as through wireless Internet connection, Wi-Fi, Bluetooth, satellite, etc.

The information compiled to be transmitted over the network 450 can comprise part information from the computer system 300. The part information from the computer system 300 can include a part width, a part height, a part depth, a part volume, a build material, if a part is for development or production, a product group, a current process, a replacement type, a submitting engineer's name, a part volume to be removed from the part by milling, a part volume to be removed from the part by turning, and a part volume to be removed from the part by electric discharge machining (EDM), a shape complexity, if abrasive flow machining is to be used, if thermal deburring machining is to be used, if additional post processing is to be used, a part number, a total number of parts to be manufactured (for example on an annual basis), current cost of the part using a method alternative to additive manufacturing, and the current scrap rate of the current part manufacturing method or current part acquisition method.

The information from the resource estimation system 200 can include determined information including a number of parts per manufacturing run, an estimated manufacturing time per part, per manufacturing run, or per total number of parts to be manufactured; a consumable cost per part, per manufacturing run or per total number of parts to be manufactured; a build material cost per part, per manufacturing run, or per total number of parts to be manufactured; a utility cost per part, per manufacturing run, or per total number of parts to be manufactured; a capital cost per part, per manufacturing run, or per total number of parts to be manufactured; an operation labor cost per part, per manufacturing run, or per total number of parts to be manufactured; a post processing cost per part, per manufacturing run, or per total number of parts to be manufactured; a total cost per manufacturing run, a total cost per part, a summation of tooling costs, a number of additive manufacturing devices 100 based on a total number of parts to be manufactured, a total number of additive manufacturing device operator labor hours needed for the total number of parts to be manufactured, a total number of additive manufacturing device operators needed for the total number of parts to be manufactured, a total number of post processing operator labor hours for the total number of parts to be manufactured, a total number of post processing operators needed for the total number of parts to be manufactured, and a percentage savings between the part manufactured by the additive manufacturing device 100 in comparison between the part manufactured or acquired by an alternative manufacturing method or supplier.

Accordingly, the network 450 is operative to facilitate transmittal of information, such as part information and determined information between the computer system 300 and the computational device 470.

The preceding detailed description is merely exemplary in nature and is not intended to limit the invention or the application and uses of the invention. The described embodiments are not limited to use in conjunction with a particular type of additive manufacturing device 100 or process. Hence, although the present disclosure, for convenience of explanation, depicts and describes particular embodiments of the resource estimation system 200, it will be appreciated that the resource estimation system 200 in accordance with this disclosure can be implemented in various other configurations. Any explanation in connection with one embodiment applies to similar features of other embodiments, and elements of multiple embodiments can be combined to form other embodiments. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A resource estimation system for an additive manufacturing device, the system comprising:
    at least one processor; and
    a memory storing software that, when executed by the at least one processor,
        receives part information including a part width, a part depth, a build plate area of the additive manufacturing device, a number of parts to be manufactured, a type of build material, a part volume, a shape complexity value, and a current cost,
        references a portion of the part information and determines a number of parts to be manufactured per manufacturing run based on the part width, the part depth, and the build plate area of the additive manufacturing device,
        references a portion of the part information and determines a number of manufacturing runs based on the number of parts to be manufactured and the number of parts that can be manufactured per manufacturing run,
        references a portion of the part information and estimates manufacturing time by referencing the part volume, referencing the build material, referencing a database including manufacturing speed information with regards to the type of build material, referencing the number of parts that to be manufactured,
        references a portion of the part information and determines a material cost based on the type of build material, the part volume, and the number of parts that can be manufactured per manufacturing run,
        references a portion of the part information and determines a utility cost based on the estimated manufacturing time and utilities to be used for manufacturing the part,
        determines a capital cost that is proportionate to the cost of the additive manufacturing device based on the estimated manufacturing time and an operational lifetime of the additive manufacturing device,
        determines an operation labor cost based on a setup time, a teardown time, and a labor rate,
        references a portion of the part information and determines a post processing cost based on the number of parts to be manufactured, the type of build material, and the shape complexity value, wherein the post processing cost is further based on the use of at least one of abrasive flow machining, thermal deburring machining, and additional post processing, and
        determines a total cost per manufacturing run based on the material cost, utility cost, capital cost, operation labor cost, and post processing cost.

2. The system of claim 1, wherein the post processing cost is further based on a volume of material to be removed from each of the parts by milling, a volume of material to be removed from each of the parts by turning, and a volume of material to be removed from each of the parts by electric discharge machining.

3. The system of claim 1, wherein the memory storing software that, when executed by the at least one processor further determines a consumables cost based on the estimated manufacturing time in proportion to a lifetime of a filter and based on a recoater blade with a per manufacturing run cost.

4. The system of claim 1, wherein the utilities include argon and electricity with per unit of time cost associations.

5. The system of claim 1, wherein the memory storing software that, when executed by the at least one processor, further determines a usage cost that is proportionate to a cost of an additive manufacturing device warranty.

6. The system of claim 1, wherein the post processing cost is further based on steam cleaning time, stress relief time, wire electric discharge machining time, tumbler deburr time, plate resurfacing time, and hot isostatic pressing volume.

7. The system of claim 1, wherein the memory storing software that, when executed by the at least one processor further compares the total cost to the current cost.

8. The system of claim 7, wherein the memory storing software that, when executed by the at least one processor, further communicates the part information, the estimated manufacturing time, the number of parts that can be manufactured per manufacturing run, the number of manufacturing runs, the material cost, the utility cost, the capital cost, the operation labor cost, the post processing cost, the total cost, and the comparison information, to at least one computational device via a network.

9. A method for a resource estimation system for an additive manufacturing device, the method comprising:
receiving, at a processor, part information including a part width, a part depth, a build plate area of the additive manufacturing device, a number of parts to be manufactured, a type of build material, a part volume, and a shape complexity value;
determining, at the processor, a number of parts to be manufactured per manufacturing run based on the part width, the part depth, and the build plate area of the additive manufacturing device;
determining, at the processor, a number of manufacturing runs based on the number of parts to be manufactured and the number of parts that can be manufactured per manufacturing run;
estimating, at the processor, manufacturing time by referencing the part volume, referencing the build material, referencing a database including manufacturing speed information with regards to the type of build material, referencing the number of parts that to be manufactured;
determining, at the processor, a material cost based on the type of build material, the part volume, and the number of parts that can be manufactured per manufacturing run;
determining, at the processor, a utility cost based on the estimated manufacturing time and utilities to be used for manufacturing the part, wherein the utilities include argon and electricity with per unit of time cost associations;
determining, at the processor, a capital cost that is proportionate to the cost of the additive manufacturing device based on the estimated manufacturing time and an operational lifetime of the additive manufacturing device;
determining, at the processor, an operation labor cost based on a setup time, a teardown time, and a labor rate;
determining, at the processor, a post processing cost based on the number of parts to be manufactured, the type of build material, and the shape complexity value; and
determining, at the processor, a total cost per manufacturing run based on the material cost, utility cost, capital cost, operation labor cost, and post processing cost.

10. The method of claim 9, wherein the method includes determining, at the processor, a consumables cost based on the estimated manufacturing time in proportion to a lifetime of a filter and based on a recoater blade with a per manufacturing run cost.

11. The method of claim 9, wherein the method includes determining, at the processor, a usage cost based on the estimated manufacturing time in proportion to the lifetime of a warranty.

12. The method of claim 9, wherein the post processing cost is further based on a volume of material to be removed from each of the parts by milling, a volume of material to be removed from each of the parts by turning, and a volume of material to be removed from each of the parts by electric discharge machining.

13. The method of claim 9, wherein the post processing cost is further based on steam cleaning time, stress relief time, wire electric discharge machining time, tumbler deburr time, plate resurfacing time, and hot isostatic pressing.

14. The method of claim 9, wherein the post processing cost is further based on the use of at least one of abrasive flow machining, thermal deburring machining, and additional post processing.

15. The method of claim 9, wherein the method includes comparing, at the processor, the total cost to the current cost.

16. The method of claim 14, wherein the method includes communicating the part information, the manufacturing time, the number of parts that can be manufactured per manufacturing run, the material cost, the utility cost, the capital cost, the operation labor cost, the post processing cost, the total cost, and the comparison information, to at least one computational device via a network.

17. A non-transitory computer-readable medium having instructions stored therein, wherein the instructions, when executed by a processor, cause the processor to:
determine a number of parts that can be manufactured per manufacturing run based on part information including a part width, a part height, and a build plate area of the additive manufacturing device;
estimate manufacturing time by referencing a database including manufacturing speed information with regards to a type of build material, referencing the number of parts that can be manufactured per manufacturing run, referencing a number of parts to be manufactured, and referencing a part volume;
determine a material cost based on the type of build material, the part volume, and the number of parts that to be manufactured;
determine a utility cost based on the estimated manufacturing time and utilities to be used;
determine capital cost by comparing the estimated manufacturing time with a cost of the additive manufacturing device in proportion with an expected lifetime of the additive manufacturing device;
determine an operational labor cost based on a setup time, a teardown time, and a labor rate;
determine a post processing cost based on the build material type, selecting at least one material removal method, and a volume to be removed in association with the at least one material removal method, wherein the post processing cost is further based on the use of at least one of abrasive flow machining, thermal deburring machining, and additional post processing; and determine a total cost based on the material cost, utility cost, capital cost, operational labor cost, and post processing cost.

18. The instructions of claim 17, wherein the post processing cost is further based on a volume of material to be removed from each of the parts by milling, a volume of material to be removed from each of the parts by turning, and a volume of material to be removed from each of the parts by electric discharge machining.

* * * * *